United States Patent [19]

Teranishi et al.

[11] Patent Number: 4,879,615
[45] Date of Patent: Nov. 7, 1989

[54] CARTRIDGE TRANSFER MECHANISM FOR A DISK FILE APPARATUS

[75] Inventors: Shunichi Teranishi, Anjo; Takeshi Hayashi, Kariya, both of Japan

[73] Assignee: Aisin Seiki Kabushiki Kaisha, Aichi, Japan

[21] Appl. No.: 137,704

[22] Filed: Dec. 24, 1987

[30] Foreign Application Priority Data

Dec. 26, 1986 [JP] Japan ................................. 61-314348

[51] Int. Cl.$^4$ ........................ G11B 17/12; G11B 17/22
[52] U.S. Cl. ......................................... 369/34; 369/34; 369/178; 360/98.04
[58] Field of Search ............... 360/98, 91, 92; 369/34, 369/36, 38, 75.1, 178, 191–192; 414/277, 280, 281, 416, 749, 751

[56] References Cited

U.S. PATENT DOCUMENTS

| | | | |
|---|---|---|---|
| 4,502,133 | 2/1985 | Siryj et al. | 369/34 |
| 4,504,936 | 3/1985 | Faber et al. | 360/98 X |
| 4,608,679 | 8/1986 | Rudy et al. | 369/34 |
| 4,742,504 | 5/1988 | Takasuka et al. | 369/36 |

Primary Examiner—Stuart N. Hecker
Assistant Examiner—David J. Severin
Attorney, Agent, or Firm—Sughrue, Mion, Zinn, Macpeak & Seas

[57] ABSTRACT

A disk file apparatus including an accommodating shelf having a multiplicity of accommodating spaces provided therein in a row in the vertical direction, a multiplicity of cartridges disposed in the accommodating spaces, respectively, each having a disk received therein, a coder which writes or reads information in relation to either the side A or B of the disk received in each of the cartridges, and a carrier arranged such as to move vertically along the front surface of the accommodating shelf, draw out one of the multiplicity of cartridges, and load the cartridge into the coder after turning the cartridge through 180 degrees according to need. The disk file apparatus is provided with a transfer mechanism disposed at the side of the apparatus which is closer to the accommodating shelf. The transfer mechanism has a feed and discharge port through which a cartridge is taken in from and discharged to the outside, and a moving mechanism which is rotatable back and forth to make a half turn during a cartridge feed or discharge operation so as to reach a position where it is able to exchange a cartridge with the carrier. Accordingly, there is no fear of the transfer mechanism interfering with the vertical travel path of the carrier, and it is therefore possible to dispose the transfer mechanism at any position in the apparatus.

3 Claims, 5 Drawing Sheets

CARTRIDGE TRANSFER MECHANISM FOR A DISK FILE APPARATUS

BACKGROUND OF THE INVENTION

1. Field of the Invention

The present invention relates to a disk file apparatus and, more particularly, to a cartridge transfer mechanism for use in a disk file apparatus.

2. Description of the Related Art

One type of conventional disk file apparatus is disclosed in the specification of Japanese Utility Model Laid-Open No. 61-13637 (1986).

The cartridge transfer mechanism of this disk file apparatus comprises a cartridge feed and discharge port which is provided at the side of the apparatus which is closer to a carrier, and a slide mechanism which takes in a cartridge through the port and slides it horizontally toward an accommodating shelf, so that the cartridge is taken in through the feed and discharge port and once slid toward the accommodating shelf and then disposed at a position where the cartridge is able to be transferred to the carrier. Thereafter, the cartridge is loaded into a loader by the operation of the carrier.

The above-described arrangement suffers, however, from the following problem. Namely, when a cartridge inserted from the cartridge feed and discharge port slides toward the accommodating shelf, it crosses the vertical travel path of the carrier. For this reason, it has heretofore been possible to dispose the transfer mechanism only at a position where it will not interfere with the movement of the carrier, that is, at either the upper or lower portion of the disk file apparatus. Therefore, a large-sized disk file apparatus has a fear of the transfer mechanism hindering the operation of loading and unloading cartridges through the feed and discharge port.

SUMMARY OF THE INVENTION

Accordingly, it is a primary object of the present invention to provide a disk file apparatus which is so designed that it is possible to dispose the cartridge transfer mechanism at any position in the apparatus without the fear of the mechanism interfering with the movement of the carrier.

To this end, the present invention provides a disk file apparatus which comprises a transfer mechanism disposed at the side of the apparatus which is closer to the accommodating shelf, the transfer mechanism having a feed and discharge port through which a cartridge is taken in from and discharged to the outside, and a moving mechanism which is rotatable back and forth to make a half turn during a cartridge feed or discharge operation so as to reach a position where it is able to exchange a cartridge with the carrier.

By virtue of the above-described arrangement, a cartridge inserted from the feed and discharge port is automatically turned at the accommodating shelf side by the operation of the moving mechanism and thereby set at a position where it is able to be transferred to the carrier.

The above and other objects, features and advantages of the present invention will become apparent from the following description of the preferred embodiment thereof taken in conjunction with the accompanying drawings.

BRIEF DESCRIPTION OF THE DRAWINGS

FIG. 3a is sectional view taken along the line II—II of FIG. 2a;

DESCRIPTION OF THE PREFERRED EMBODIMENT

One embodiment of the present invention will be described hereinunder in detail with reference to the accompanying drawings.

The outline of the disk file apparatus 1 will first be explained.

Figure 1:
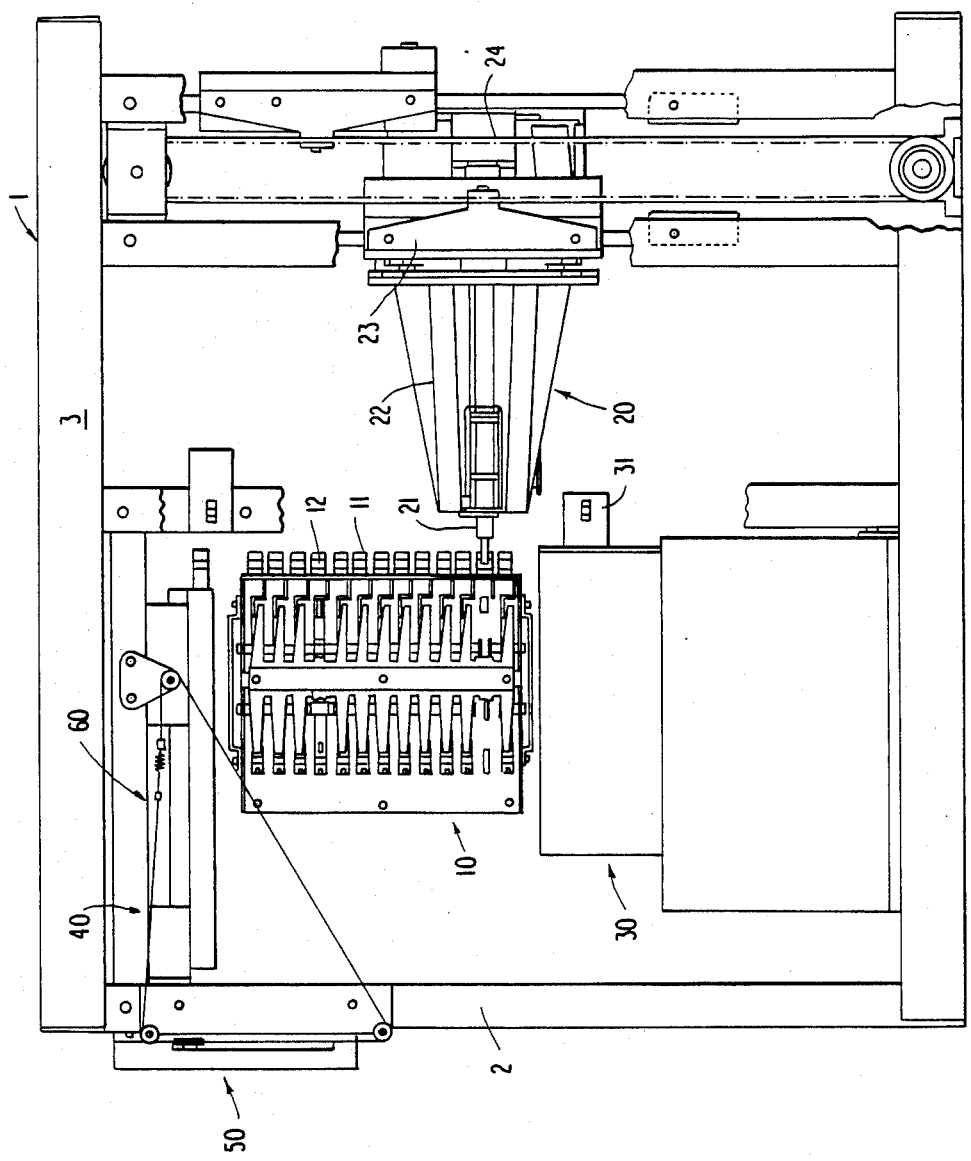
FIG. 1 is a side view of one embodiment of the disk file apparatus according to the present invention.

Referring to FIG. 1, a total of thirteen thin cartridges 11 are accommodated inside an accommodating shelf 10 in such a manner that the cartridges 11 are vertically spaced apart from each other, and a disk (not shown) both sides (the side A and the side B) of which are able to be subjected to recording and reproducing is accommodated inside each cartridge 11. When it is instructed to record (reproduce) information on (from) the side A (or B) of a particular cartridge 11, a carrier 20 which is vertically movable through a toothed belt 24 which is driven by a motor (not shown) is moved so as to face said cartridge 11, and a retainer portion 21 of the carrier 20 is then brought into fitting engagement with a fitting portion 12 of the cartridge 11 to draw out the latter from the accommodating shelf 10. The retainer portion 21 is then withdrawn into a base portion 22 of the carrier 20, and the cartridge 11 is thereby accommodated in the base portion 22. Then, the carrier 20 is lowered, and a shielding portion 25 of the carrier 20 cuts off the optical path of a photosensor 31 which is provided on a coder 30. When the carrier 20 faces an insertion port of the coder 30, the retainer portion 21 of the carrier 20 is pushed out from the base portion 22 so that the cartridge 11 is loaded into the coder 30 through the insertion port. After the cartridge 11 has been loaded, the retainer portion 21 of the carrier 20 is maintained in this position, and the downward side of the disk loaded in the cartridge 11 is subjected to writing or reading of information within the coder 30. After the completion of writing or reading in relation to the disk, the cartridge 11 is unloaded from the coder 30 by the retainer portion 21 so as to be drawn into the base portion 22. Thereafter, the carrier 20 rises to return the cartridge 11 to the previous position in the accommodating shelf 10. It should be noted that each cartridge 11 is disposed in the accommodating shelf 10 in such a manner that the side A of the disk accommodated therein faces downward; therefore, when it is instructed to write or read information in relation to the side B of the disk, the base portion 22 rotates through 180 degrees relative to a carrier body portion 23 at a predetermined position in the course of the downward travel of the carrier 20, thus enabling the side B of the disk to face downward before the cartridge 11 is loaded into the coder 30. The 180-degree rotation of the base portion 22 may be effected either before or after the downward travel of the carrier 20.

A cartridge transfer mechanism 40 according to the present invention will next be explained.

As shown in FIG. 1, the transfer mechanism 40 is disposed above the accommodating shelf 10. The cartridge transfer mechanism 40 comprises a mechanism 50 for opening and closing a cartridge feed and discharge port 41 which is provided between front pillars 2 of the disk file apparatus 1, and a moving mechanism 60 which is horizontally aligned with the feed and discharge port 41 and which is rotatable back and forth to make a half turn.

Figure 2A:
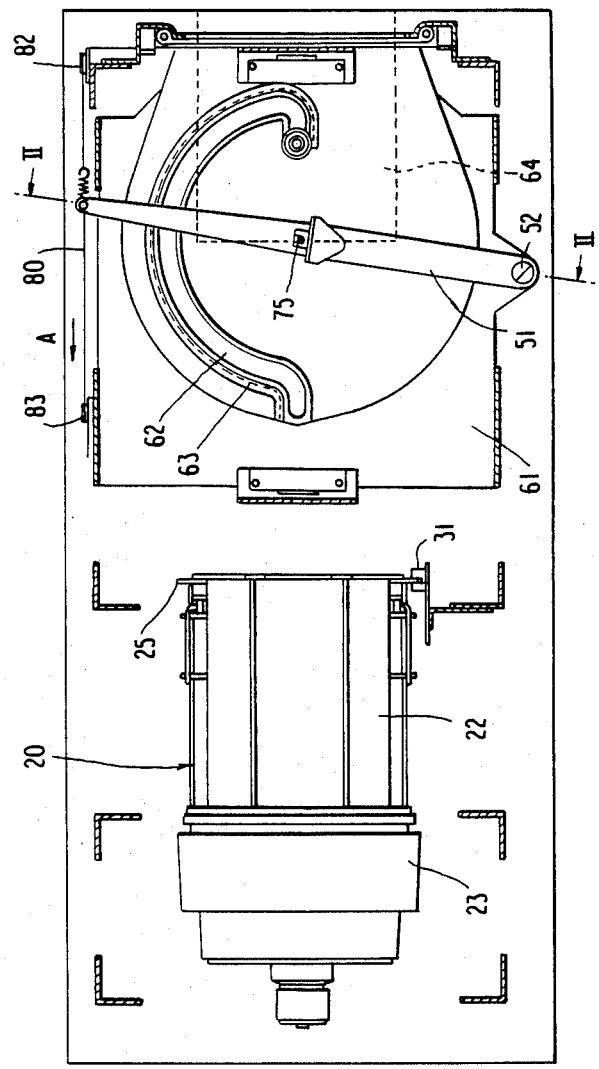
FIG. 2a is a plan view showing the disk file apparatus when the turntable is at a position where a cartridge is able to be fed or discharged.
Figure 2B:
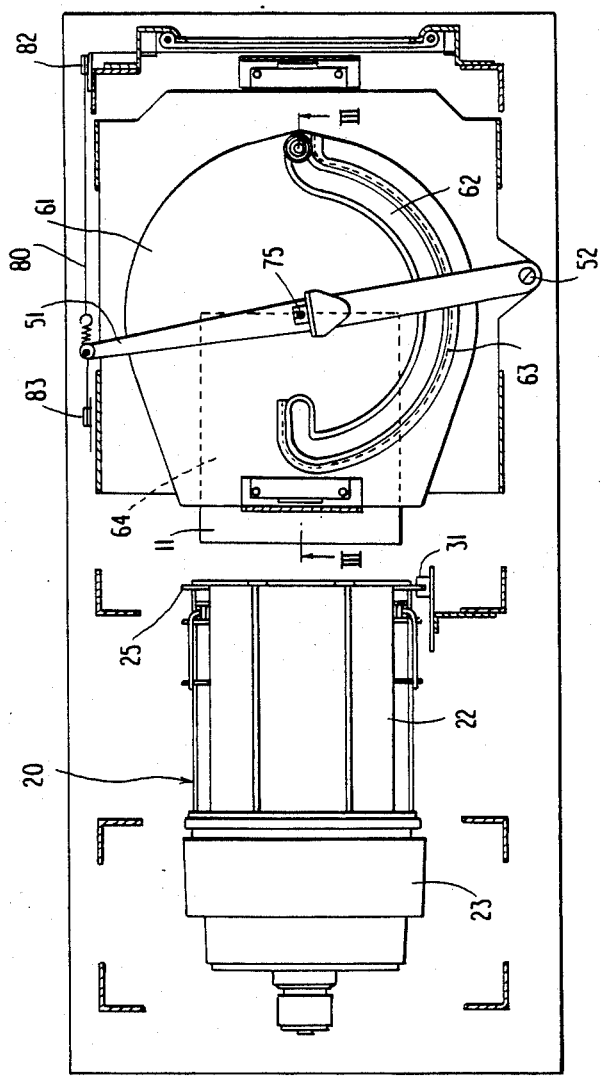
FIG. 2b is a plan view showing the disk file apparatus when the turntable is at a position where it is able to exchange a cartridge with the carrier.
Figure 3A:
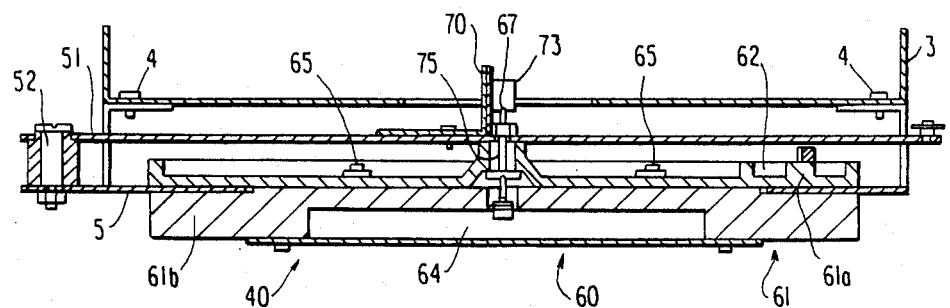
Figure 3B:
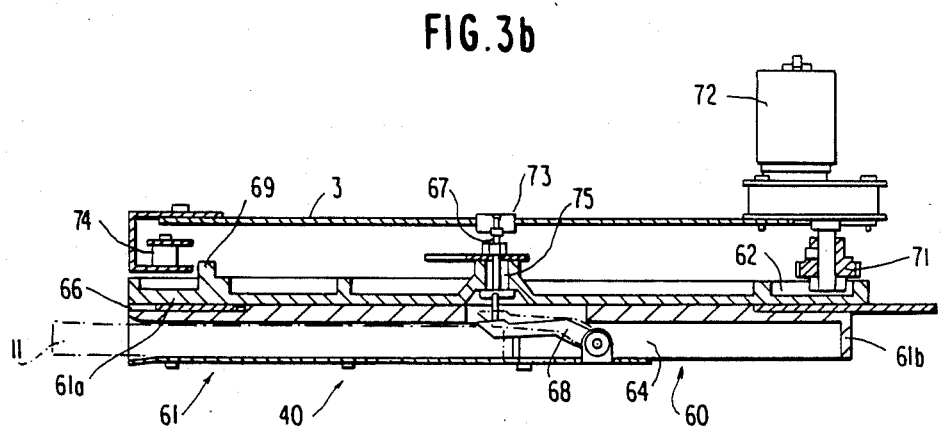
FIG. 3b is a sectional view taken along the line III—III of FIG. 2b.
Figure 4A:
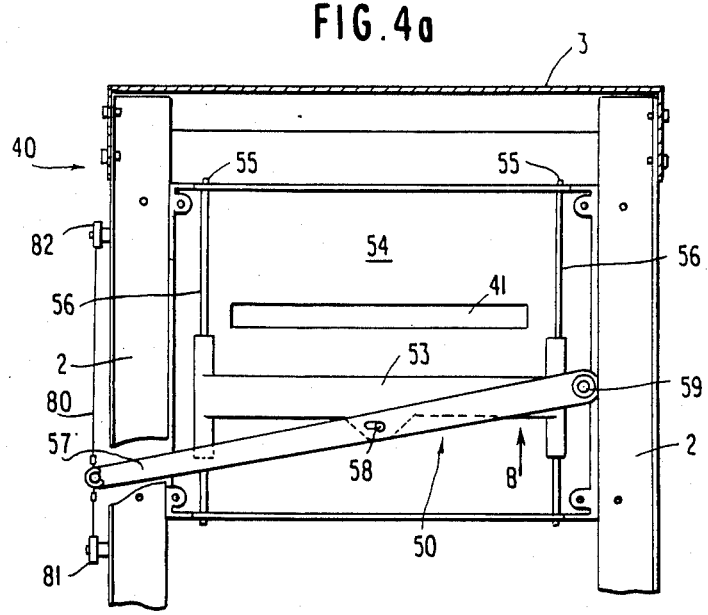
FIG. 4a shows the mechanism for opening and closing a cartridge feed and discharge port in its open position.

Thus, a cartridge 11 may be inserted into or removed from the disk file apparatus 1 through the port 41 when the port 41 is uncovered as shown in FIG. 4a. The cartridge may be inserted from the outside through port 41 into the pocket 64 or removed to the outside throught port 41 when the turntable 61 is in the position shown in FIG. 2a.

The moving mechanism 60 will first be explained. As shown in FIGS. 2a to 3b, a turntable 61 consists of a first turntable member 61a and a second turntable member 61b. A semicircular groove 62 is provided in the upper surface of the first turntable member 61a, and a rack 63 is provided along the groove 62. A cartridge receiving pocket 64 is provided inside the second turntable member 61b. Further, a groove 66 is formed in the peripheral portion of the upper surface of the second turntable member 61b. The first and second turntable members 61a, 61b are secured together in one unit by means of screws 65 to define the moving mechanism 60. The moving mechanism 60 has the edge portion of a guide table 5 received in the groove 66, the guide table 5 being rigidly secured to a top plate 3 by means of screws 4, so that the moving mechanism 60 is retained by the top plate 3 in such a manner as to be rotatable back and forth to make a half turn about a shaft 75. A loading arm 51 is supported by the shaft 75 above the moving mechanism 60 in such a manner that the arm 51 is rotatable about the shaft 75. The loading arm 51 is further supported at its left-hand end (as viewed in FIG. 3a) by a shaft 52 so that the arm 51 is pivotal about the shaft 52 in response to the 180-degree rotation of the moving mechanism 60.

Figure 4B:
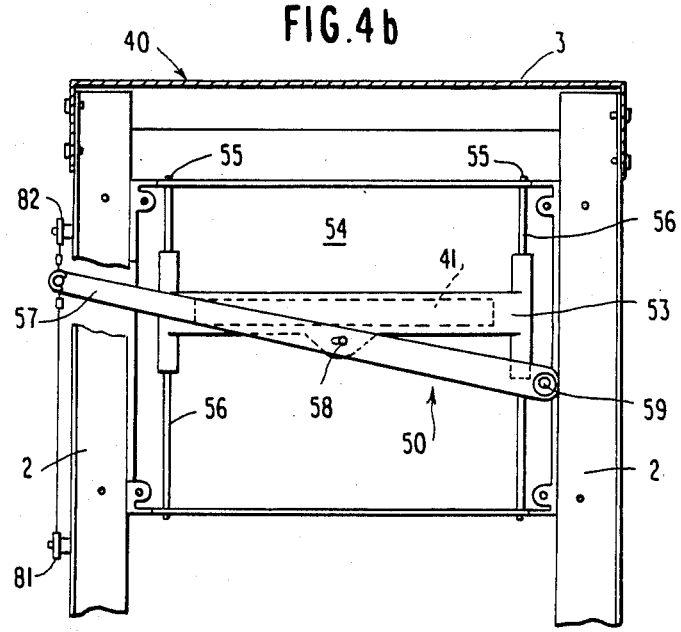
FIG. 4b shows the opening and closing mechanism in its closing position.

The mechanism 50 for opening and closing the cartridge feed and discharge port will next be explained. As shown in FIGS. 4a and 4b, a shutter 53 is slidably mounted on two guide rails 56 which are rigidly secured by means of E-rings 55 inside a box-shaped front panel 54 which is provided on the front pillars 2. A shutter arm 57 is rotatably supported at the central portion of the shutter 53 by means of a screw 58. The right-hand end (as viewed in FIG. 4a) of the shutter arm 57 is pivotally supported at the right-hand end (as viewed in FIG. 4a) of the front panel 54 by means of a screw 59. A wire 80 is rigidly secured to the left-hand end of the shutter arm 57, the wire 80 being connected to the right-hand end (as viewed in FIG. 2a) of the loading arm 51. The wire 80 is pulled through rollers 81, 82 and 83 to transmit the pivoting motion of the loading arm 51 to the shutter arm 57.

The following is a description of the operation of the above-described arrangement.

Referring to FIGS. 2a, 3a, 3b and 4a, when a cartridge 11 is inserted through the cartridge feed and discharge port 41 from the outside, the cartridge 11 is received in the cartridge receiving pocket 64. At this time, the cartridge 11 pushes up a lever 68 which is vertically pivotally provided in the inner part of the pocket 64. As the lever 68 is pushed up, a shaft 67 which is in contact with the lever 68 at all times is also pushed up. This movement of the shaft 67 is detected by a photosensor 73 which is provided at the distal end of the shaft 67 and which is retained by the loading arm 51 through a base 70, and a signal is delivered from the photosensor 73 to a controller (not shown). Thus, it is confirmed that the cartridge 11 has been received in the pocket 64, and the controller delivers a driving signal to a motor 72 which is mounted on the top plate 3 and which is provided with a pinion 71 meshed with the rack 63. In consequence, the motor 72 rotates, and while doing so, it revolves the turntable 61 around the shaft 75 due to meshing engagement of the rotating pinion 71 with the rack 63, resulting in the turntable 61 rotating a half turn clockwise from the position shown in FIG. 2a to the position shown in FIG. 2b. At this time, a shielding portion 69 which is provided on the upper surface of the turntable 61 intercepts the light exchanged between photosensors 74 which are provided at two ends, respectively, of the top plate 3, thus causing a signal to be delivered to the controller. As a result, the operation of the motor 73 is suspended, and it becomes possible to transfer the cartridge 11 to the carrier 20. In response to the above-described 180-degree rotation of the turntable 61, the loading arm 51 pivots counterclockwise about the shaft 52. This causes the wire 80 to be pulled in the direction of the arrow A in FIG. 2a. Thus, the shutter arm 57 also pivots clockwise about the screw 59, causing the shutter 53 to move in the direction of the arrow B shown in FIG. 4a. At the same time as the 180-degree rotation of the turntable 61 is completed, the shutter 53 closes the cartridge feed and discharge port 41 as shown in FIG. 4b. When the rotation of the motor 72 is reversed, the turntable 61 rotates from the position where it is able to exchange the cartridge 11 with the carrier 20 to the position where the cartridge 11 is able to be fed or discharged, and the shutter 53 opens the port 41.

Thus, the disk file apparatus according to the present invention is provided with a transfer mechanism which is disposed at the side of the apparatus closer to the accommodating shelf and which has a feed and discharge port through which a cartridge is taken in from or discharged to the outside and a moving mechanism which is rotatable back and forth to make a half turn during a cartridge feed or discharge operation so as to reach a position where it is able to exchange a cartridge with the carrier. Accordingly, there is no fear of the transfer mechanism interfering with the vertical travel path of the carrier, and it is therefore possible to dispose the transfer mechanism at any position in the apparatus. Further, even when the carrier comes into a runaway condition, there is no fear of the carrier colliding with the transfer mechanism. Thus, the arrangement of the present invention ensures a safe operation.

Although the present invention has been described through specific terms, it should be noted here that the described embodiment is not necessarily limitative and various changes and modifications may be imparted thereto without departing from the scope of the invention which is limited solely by the appended claims.

What is claimed is:

1. In a disk file apparatus comprising an accommodating shelf having a multiplicity of accommodating spaces provided therein in a vertical row for receiving a multiplicity of cartridges in said accommodating spaces, respectively, with each cartridge having a disk received therein, coding means for transferring information to or from either side of the disk receivied in each of said cartridges and carrier means arranged to move vertically along the front surface of said accommodating shelf, draw out a selected one of said cartridges and load said cartridge into said coding means with the proper orientation, wherein the improvement comprises a transfer mechanism disposed in said apparatus above said accommodating shelf for access by said carrier means, said apparatus having a feed and discharge port adjacent said transfer mechanism through which cartridges may be inserted into said transfer mechanism from the outside of said apparatus and removed from said transfer mechanism to the outside of said apparatus, said transfer mechanism mechanism comprising a rotatable mechanism having cartridge receiving means adapted to be positioned adjacent said feed and discharge port in a first position of said rotatable mechanism and disposed adjacent said carrier means in a second position of said rotatable mechanism and means for rotating said rotatable mechanism between said firsts and second positions.

2. A disk file apparatus according to claim 1 further comprising cover means for opening and closing said feed and discharge port in response to rotation of said rotatable mechanism.

3. A disk file apparatus according to claim 2, wherein said cover means is comprised of a plate mounted for vertical movement relative to said port.

* * * * *